US006651002B1

(12) United States Patent
Morgan (10) Patent No.: US 6,651,002 B1
(45) Date of Patent: Nov. 18, 2003

(54) WAVELET COMPRESSION OF GRAVITY CORRECTION DATA

(75) Inventor: Kenneth A. Morgan, Petersburg, FL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/325,073

(22) Filed: Dec. 20, 2002

(51) Int. Cl.[7] .............................................. G01C 21/16
(52) U.S. Cl. ........................ 701/220; 701/216; 701/217; 701/141; 342/357.13; 342/357.14
(58) Field of Search .............................. 701/220, 217, 701/216, 214, 221, 224; 702/141; 342/357.13, 357.14

(56) References Cited

U.S. PATENT DOCUMENTS

| | | | |
|---|---|---|---|
| 4,303,978 A | * 12/1981 | Shaw et al. | 701/220 |
| 5,245,347 A | * 9/1993 | Bonta et al. | 342/149 |
| 5,379,223 A | * 1/1995 | Asplund | 701/4 |
| 5,774,832 A | 6/1998 | Vanderwerf | 701/220 |
| 6,564,148 B2 | * 5/2003 | Morgan et al. | 701/220 |
| 2002/0008661 A1 | * 1/2002 | McCall et al. | 342/357.14 |
| 2002/0156579 A1 | * 10/2002 | Morgan et al. | 701/220 |
| 2002/0194914 A1 | * 12/2002 | Foxlin et al. | 73/514.01 |

OTHER PUBLICATIONS

Hunt et al., "Compensating For Gravity Deflection In An Interial System", 7 pgs.
Daubechies et al., "Factoring Wavelet Transforms Into Lifting Steps", Sep. 1996, revised Nov. 1997, pp. 1–26.
Strand and Nguyen, "Wavelets and Filter Banks", Wellesley Cambridge Press, Revised edition 1997, pp. 338 & 339.

* cited by examiner

*Primary Examiner*—William A. Cuchlinski, Jr.
*Assistant Examiner*—Ronnie Mancho
(74) *Attorney, Agent, or Firm*—Schiff Hardin & Waite (57) ABSTRACT

Compressed wavelet transform coefficients are used to correct outputs of inertial sensors for gravitational deflections. The compressed wavelet transform coefficients comprise gravitational deflection data that is first converted to discrete wavelet coefficients by a discrete wavelet transform and that are then compressed to form the compressed wavelet transform coefficients. An inertial sensor signal relating to a first navigational parameter of a vehicle is generated. The compressed discrete wavelet coefficients are accessed from a memory based on a position of the vehicle. The accessed coefficients are decompressed, and an inverse discrete wavelet transform is performed on the decompressed coefficients to produce gravitational compensation data. The sensor signal is compensated based on the gravitational compensation data.

43 Claims, 6 Drawing Sheets

WAVELET COMPRESSION OF GRAVITY CORRECTION DATA

TECHNICAL FIELD OF THE INVENTION

The present invention relates to the compensation of gravity deflections in navigation systems and, more particularly, relates to an inertial navigation system having a memory that stores gravity compensation values for the compensation of gravity deflections.

BACKGROUND OF THE INVENTION

An inertial navigation system is a self-contained system that uses inertial sensors and a system processor to determine velocity and position of a vehicle. The inertial sensors typically include a set of accelerometers on the vehicle that measure linear acceleration along three axes of the vehicle. The system processor integrates the acceleration data according to classical Newtonian mechanics in order to estimate the velocity and position of the vehicle.

These estimates of velocity and position have an inaccuracy resulting from an inability of the accelerometers to distinguish between vehicle acceleration and gravitational acceleration. That is, instead of measuring only vehicle acceleration, the accelerometers measure the vector sum of vehicle acceleration and gravitational acceleration. This sum is known as specific force acceleration. As a result, an accurate determination of the actual vehicle acceleration requires the navigation system to compensate for the effect of gravity on the accelerometers. This compensation involves adding (or subtracting) a gravitation term to (or from) the outputs of the accelerometers and to calculate velocity and position based upon the adjusted accelerations.

Unfortunately, gravity is not uniform around Earth. Therefore, the gravitation compensation terms used to adjust the outputs of accelerometers are typically generated by modeling Earth (or other celestial body) as an ellipsoid with a purely vertical gravitational field. Vertical means perpendicular to a plane that is tangent to the ellipsoid at the point of interest. Thus, if Earth were a sphere, its purely vertical field would extend radially from its center and, therefore, a single gravity compensation term would be used to model Earth and to compensate for the effects of gravity on the outputs of the accelerometers.

However, Earth's shape is more irregular than the model, and therefore, Earth's gravitational field is much more irregular than the model suggests. That is, Earth's gravitational field not only varies in magnitude according to distance from Earth but also in direction according to local geographic features such as mountains, ocean trenches, etc. In other words, Earth's gravitational field (and indeed that of any imperfectly shaped celestial body) deviates from a strictly vertical direction due to these geographic anomalies. These deviations are known as gravity deflections.

Gravity deflections, typically measured as North and East angles of deflection from the vertical, can have magnitudes on the order of ten micro-radians ($\mu$ rad) and higher. For example, the 34,000-feet-deep Kuril trench, stretching along the North Pacific airway between the U.S. and the Far East, generates gravity deflections exceeding 300 micro-radians. Deflections of this magnitude drive the velocity and position estimates of conventional inertial navigation systems outside acceptable performance bounds. As a consequence, vehicles using these conventional inertial navigation systems are apt to weave, or oscillate, about their desired courses, wasting time and fuel in the process, and adversely affecting the accuracy of inertial navigation systems.

To meet these concerns, high-precision navigation systems have implemented various compensation schemes. These schemes have included using statistical estimators to estimate the deflections, gravimeters to measure actual gravitation, and two-dimensional polynomial models to compute the deflections. Although these schemes improve accuracy, they are also quite costly in terms of computational overhead and/or hardware complexity, especially for the comparatively modest demands of commercial systems.

U.S. Pat. No. 5,774,832 discloses a navigation system incorporating a memory that stores gravity compensation data. The processor then accesses the stored gravity compensation data, based on position of the vehicle, in order to compensate for the gravity sensed by on-board inertial sensors. To conserve memory, the gravity compensation data is compressed. However, even using the data compression techniques disclosed in the '832 patent, the amount of stored data still exceeds the capacity of many practical memories.

Accordingly, the present invention is directed to a compression technique for the compression of gravitational deflection data that solves one or more of these or other problems.

SUMMARY OF THE INVENTION

According to one aspect of the present invention, a vehicle navigation method comprises the following: generating an inertial sensor signal relating to a navigational parameter of a vehicle; accessing discrete wavelet coefficients from a memory based on a position of the vehicle; performing an inverse discrete wavelet transform on the discrete wavelet coefficients to produce compensation data; and, compensating the inertial sensor signal based on the compensation data.

According to another aspect of the present invention, a method comprises the following: performing a discrete wavelet transform on raw gravitational deflection data to produce coefficients; performing a lossless compression on the coefficients to produce compressed coefficients; and, storing the compressed coefficients in a memory of a vehicle navigation system.

According to still another aspect of the present invention, a method uses compressed wavelet transform coefficients in order to correct outputs of inertial sensors for gravitational deflections. The compressed wavelet transform coefficients comprise gravitational deflection data that is first converted to discrete wavelet coefficients by a discrete wavelet transform and that is then compressed to form the compressed wavelet transform coefficients. The method comprises the following: generating an inertial sensor signal relating to a navigational state of a vehicle; accessing the compressed discrete wavelet coefficients from a memory based on a position of the vehicle; decompressing the accessed coefficients; performing an inverse discrete wavelet transform on the decompressed coefficients to produce gravitational compensation data; and, compensating the inertial sensor signal based on the gravitational compensation data.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
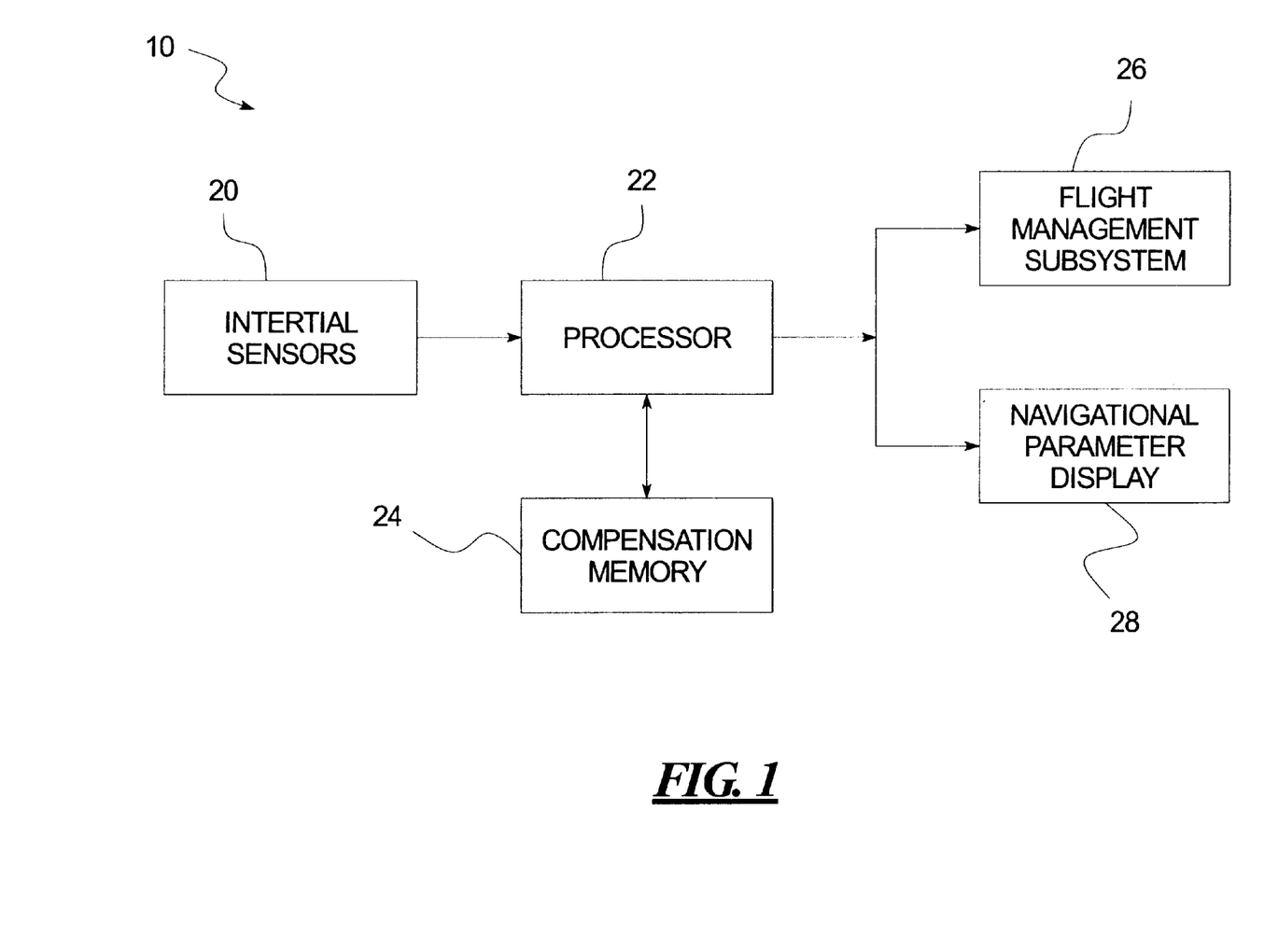
FIG. 1 illustrates an inertial navigation system according to an embodiment of the present invention.

FIG. 1 shows a block diagram of an inertial navigation system 10. The navigation system 10 may be mounted on an aircraft (not shown) and comprises inertial sensors 20, a processor 22, a compensation memory 24, a flight management subsystem 26, and a navigational parameter display 28.

The inertial sensors 20 include a set of accelerometers to measure aircraft acceleration and to provide output signals representing the sensed accelerations. The processor 22 uses these output signals to estimate velocity, position, attitude, and/or heading of the aircraft. To compensate for the gravity deflections described above, the processor 22 accesses gravitational deflection compensation data from the compensation memory 24.

More specifically, the compensation memory 24 contains map-like compensation data based on the gravity deflections of one or more geographic regions. The processor 22 searches the compensation memory 24 for data corresponding to the position of the aircraft, interpolates this data as needed to the position of the aircraft, and compensates the velocity and/or position estimates for the aircraft based on the compensation data. The processor 22 then outputs the compensated estimates to the flight management system 26 and the navigational parameter display 28. The flight management system 26, monitors the actual path of the aircraft against its desired flight path, computes time and/or distance from various milestones, computes fuel consumption estimates, etc. The navigational display 28 presents navigational data to the crew of the aircraft.

The present invention, therefore, provides a navigation system with a simple mechanism, i.e., a look-up table, to use in compensating gravity deflections. For applications where the size of the compensation memory 24 may be problem, the compensation memory 24 preferably includes gravity deflection compensation data that is compressed as described herein. The compression implemented herein is based on the discrete wavelet transform described in the paper by Ingrid Daubechies and Wim Sweldens entitled "Factoring Wavelet Transforms into Lifting Steps" which was written in 1996 and was revised in 1997.

Figure 2:
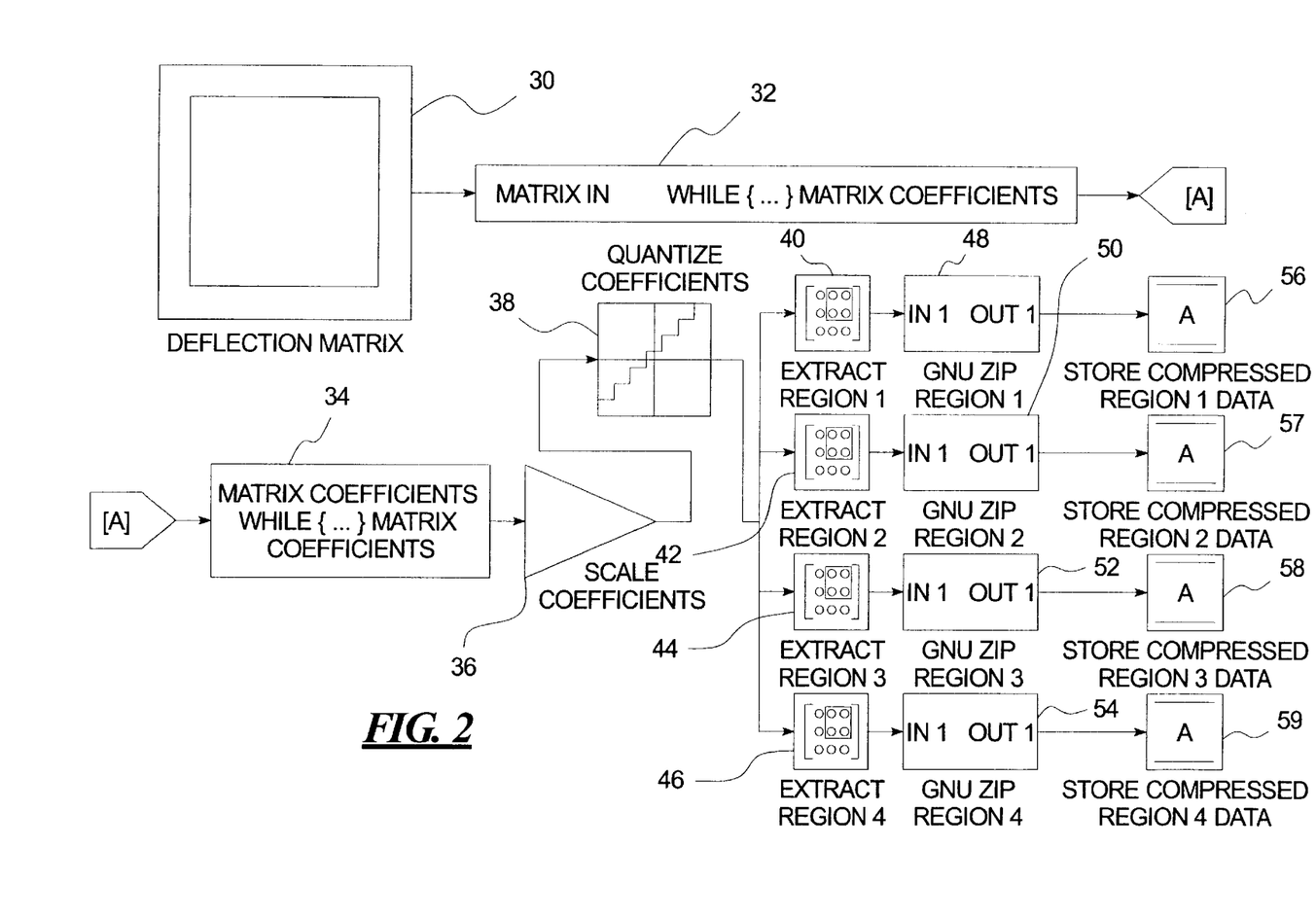
FIG. 2 illustrates the compression steps that are used according to the present invention in order to compress the gravity deflection data prior to this data being stored in the compensation memory of FIG. 1.

The block diagram of FIG. 2 describes the compression steps used to compress the gravity deflection data prior to this data being stored in the compensation memory 24. The raw gravity deflection compensation data are in the form of a matrix and are represented pictorially in a block 30 of FIG. 2. If these starting data are not valid at the desired altitude, it may be necessary to extrapolate the data to the desired altitude. Moreover, if the starting data are sea level data, the extrapolation of the data to a higher altitude advantageously may result in increased spacing between data entries.

A block 32 forms a discrete wavelet transform for each row of the gravity deflection data of the block 30. The coefficients resulting from this transform form a matrix of the same size as the gravity deflection compensation data matrix. As shown by a block 34, the same wavelet transform is then performed on the columns of the matrix resulting from the block 32 in order to form a transform gravity deflection data matrix. The coefficients in the transform gravity deflection data matrix are scaled at a block 36 by a scaling factor $1/K^2$, and the scaled coefficients are quantized at a block 38 based on an acceptable amount of information loss.

The coefficients are then segmented into regions as indicated by blocks 40, 42, 44, and 46. The purpose of segmenting the data into regions is to limit the size of the compensation memory 24. Also, the actual number of regions depends on the size of the compensation memory 24. Thus, although four regions are disclosed in FIG. 2, more or fewer regions could be used. Indeed, the coefficients need not be segmented into regions if adequate memory is available. Blocks 48, 50, 52, and 54 then compress the regional coefficient data using a substantially lossless compression algorithm, such as the publicly available GNU ZIP software. Finally, blocks 56, 57, 58, and 59 store the compressed coefficients of one or more regions in the memory 24.

Figure 3:
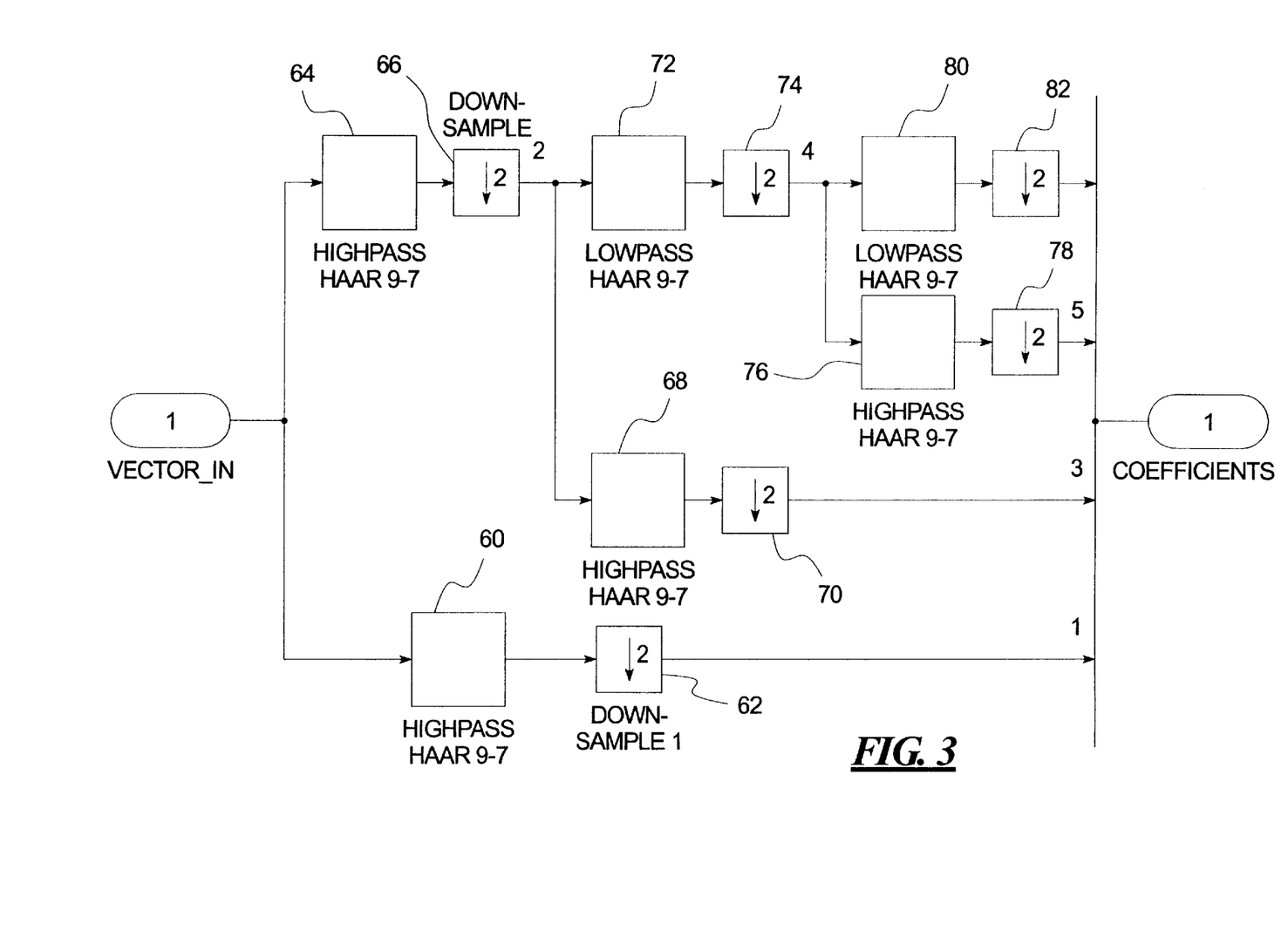
FIG. 3 illustrates the discrete wavelet transform that may be implemented during the compression steps of FIG. 2.

FIG. 3 illustrates the discrete wavelet transform that may be implemented by the blocks 32 and 34 of FIG. 2. It is noted that the wavelet transform shown in FIG. 3 does not include the lifting steps described in the Daubechies and weldens paper. The discrete wavelet as represented by FIG. 3 applies low pass filters and complementary high pass filters to the input gravitational deflection data in order to divide the data into the desired frequency ranges. The filter outputs are down sampled as shown.

As discussed above, the same transformation is first applied by row and is then applied by column to divide the data by frequency. The filtering and down sampling process is repeated as many times as deemed necessary to achieve the desired frequency separation. As a practical matter, three frequency separations as shown in FIG. 3 should suffice.

Accordingly, as shown in FIG. 3, the gravitational deflection data are high pass filtered by a high pass filter 60 and are then down sampled by a factor of two by a down sampler 62 to separate the gravitational deflection data in a first frequency range into a first bin. The remaining gravitational deflection data are segmented out by a low pass filter 64 and down sampled by a factor of two by a down sampler 66. The data from the down sampler 66 are high pass filtered by a high pass filter 68 and are then down sampled by a factor of two by a down sampler 70 to separate the gravitational deflection data in a second frequency range into a second bin.

The remaining gravitational deflection data are segmented out by a low pass filter 72 and down sampled by a factor of two by a down sampler 74. The data from the down sampler 74 are high pass filtered by a high pass filter 76 and are then down sampled by a factor of two by a down sampler 78 to separate the gravitational deflection data in a third frequency range into a third bin. Finally, the remaining gravitational deflection data are segmented out by a low pass filter 80 in a fourth frequency range into a fourth bin. The data in this fourth bin are then down sampled by a factor of two by a down sampler 82.

The outputs of the down samplers 62, 70, 78, and 82 are the coefficients resulting from the discrete wavelet transform.

For illustration purposes only, the wavelet transform described above may be implemented by way of the following MATLAB function:

```
function [sout,dout]=filt_97(a);

sout=zeros(length(a)/2,1);

dout=zeros(length(a)/2,1);

s1=zeros(length(a)/2,1);

d1=zeros(length(a)/2,1);

s2=zeros(length(a)/2,1);

d2=zeros(length(a)/2,1);
``` alpha=−1.586134342;
beta=−0.05298011854;
gamma=0.8829110762;
delta=0.4435068522;
eata=1.149604398;
% filter

```
    for i=2:2:length(a)−1;

d1(i/2,1)=a(i,1)+alpha*(a(i−1,1)+a(i+1,1));

end d1(length(a)/2,1)=a(end,1)+alpha*(a(end −1,1));

s1(1,1)=a(1,1)+beta*d1(1,1);

for i=4:2:length(a);

s1(i/2,1)=a(i−1)+beta*(d1(i/2,1)+d1(i/2−1,1));

end for i=1:length(d2)−1;

d2(i,1)=d1(i,1)+gamma*(s1(i,1)+s1(i+1,1));

end d2(end,1)=d1(end,1)+gamma*s1(end,1);

s2(1)=s1(1)+delta*d2(1);

for i=2:length(s2);

s2(i)=s1(i)+delta*(d2(i)+d2(i−1));

end sout=eata*s2 dout=d2/eata;
```

Figure 4:
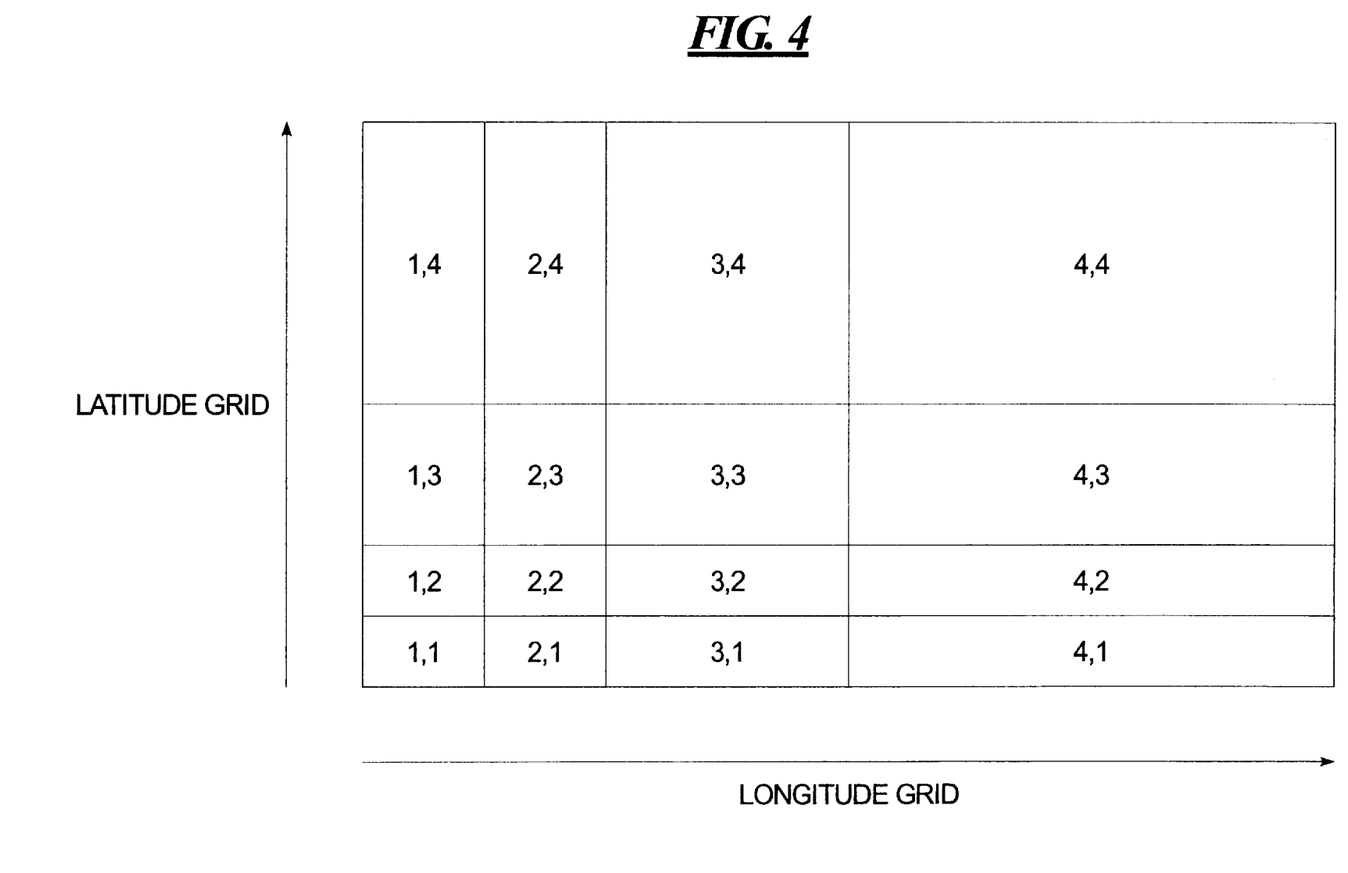
FIG. 4 illustrates frequency bands resulting from the frequency dividing implemented by FIG. 3.

FIG. 4 illustrates the frequency dividing of FIG. 3 when performed two dimensionally as indicated by the blocks 32 and 34 of FIG. 2. The frequency band 1,1 contains the lowest frequency information, whereas frequency band 4,4 contains the highest frequency information along both the latitude and longitude axes. The frequency bands of FIG. 4 contain the frequency information for the entire earth. Smaller regional grids to limit the use of the compensation memory 24 are formed from the large information matrix. The entire grouping of this grid is geographically based. The entire matrix may be compressed in one step to avoid the "gridding" effect commonly seen in JPEG images. Because the wavelet transform described above and the inverse wavelet transform described below require powers of two spacing in the size of the information matrices, some overlap of the information is required in the regions.

The quantization imposed by the block 38, for example, may be 10 arc seconds per least significant bit for all the coefficients. The scaling factor imposed by the block 36 may depend on the frequency of the coefficients. For East and North deflection, the scaling is set so that no error exceeds 10 arc seconds. For example, the scaling for section 4,4 may be 0.5, the scaling for sections 3,4 and 4,3 may be 1.0, the scaling for sections (2,4), (3,3), and (4,2) may be $\sqrt{2}$, the scaling for sections (1,4), (2,3), (3,2), and (4,1) may be 2.0. The scaling for sections (1,3), (2,2), and (3,1) may be was $2\sqrt{2}$, the scaling for sections (1,2) and (2,1) may be 4, and the scaling for section (1,1) may be $4\sqrt{2}$.

Figure 5:
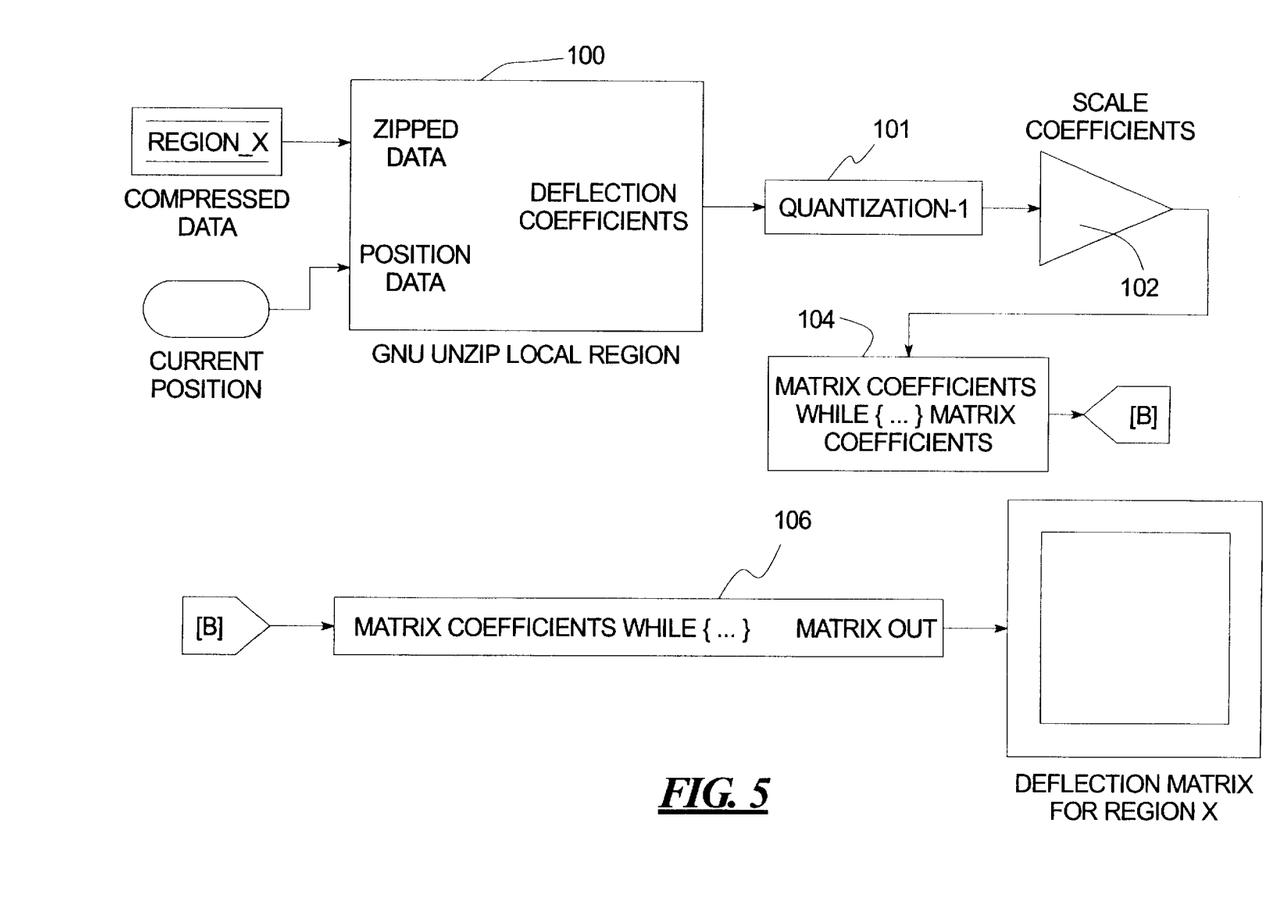
FIG. 5 illustrates an inverse transform process that is performed by the processor of FIG. 1 in order to compensate for the effects of gravity on the outputs of the inertial sensors; and, FIG. 6 illustrates an inverse discrete wavelet transform that may be implemented by the inverse transform process of FIG. 5.

FIG. 5 illustrates the decompression and inverse transform that is performed by the processor 22 in extracting gravitational deflection data that is used to compensate for the effects of gravity on the outputs of the inertial sensors 20. The current position of the aircraft is used by a block 100 to determine which region requires decompression. The block 100 then decompresses (unzips) the coefficients in this region, a block 101 imposes an inverse quantization on the decompressed coefficients, and a block 102 applies a scale factor to the inverse quantized decompressed coefficients. The inverse quantization implemented by the block 101 is the inverse of the quantization implemented by the block 38, and the scale factor implemented by the block 102 is the inverse of the scale factor implemented by the block 36.

A block 104 performs an inverse wavelet transform on the coefficients in each of the columns in the output of the block 102, and a block 106 performs the same inverse wavelet transform on the rows of the matrix at the output of the block 104. The data at the output of the block 106 are the gravitational compensation deflection data (shown graphically in a block 108) used to compensate the outputs of the inertial sensors 20. This data is supplied to the processor 22 which selects relevant data based on vehicle position in order to compensate the output of the inertial sensors 20 for gravitational effects.

Figure 6:
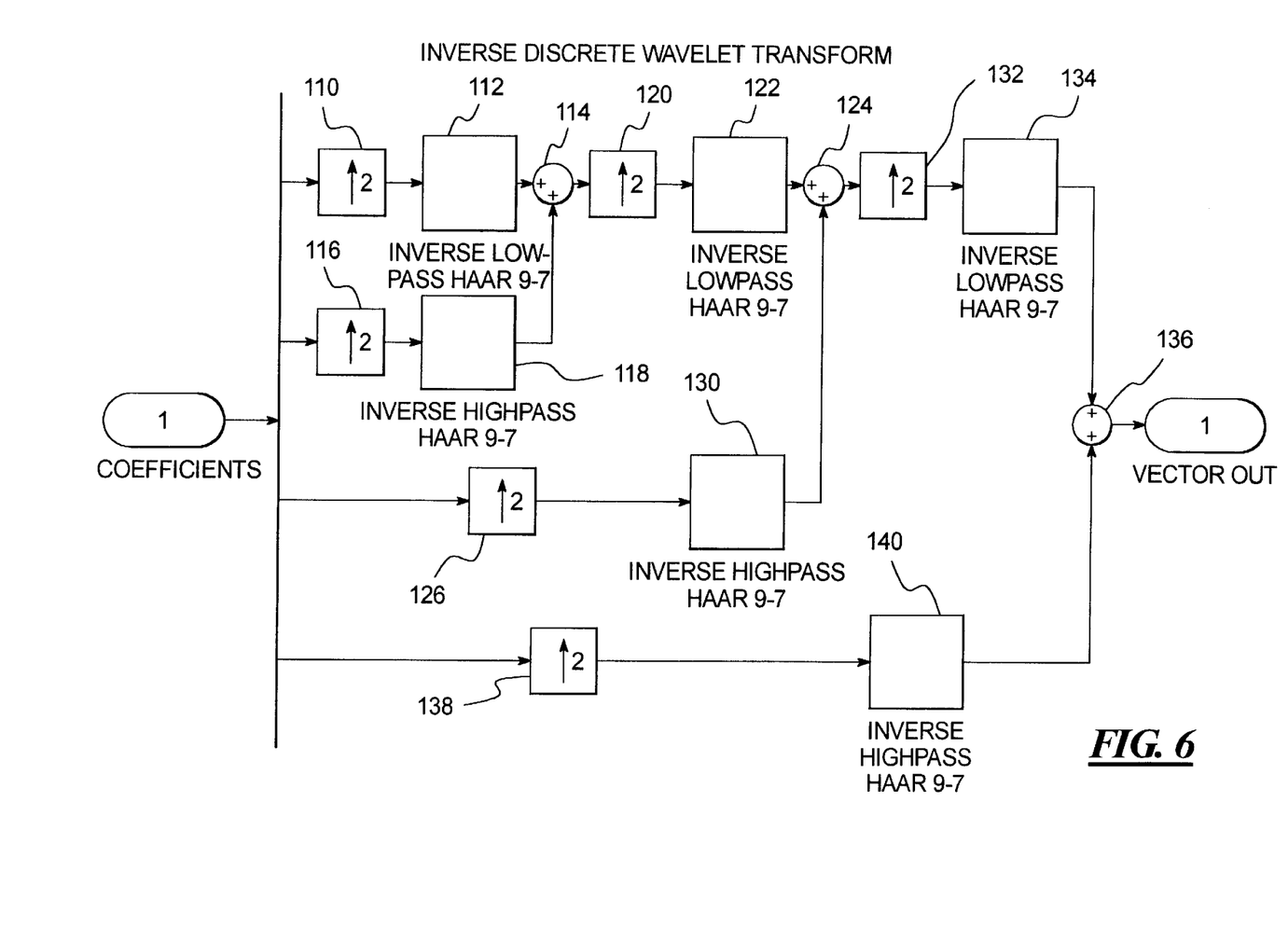

FIG. 6 illustrates the inverse discrete wavelet transform that may be implemented by the blocks 104 and 106 of FIG. 5. The inverse discrete wavelet transform shown in FIG. 6 is referred as the synthesis phase and reforms the deflection matrix from the different frequency bands.

The data at the input of the inverse discrete wavelet transform are up sampled by a factor of two by an up sampler 110, and the up sampled data are inverse low pass filtered by an inverse low pass filter 112 for supply to a first input of a summer 114. The data at the input of the inverse discrete wavelet transform are also up sampled by a factor of two by an up sampler 116, and the up sampled data are inverse high pass filtered by an inverse high pass filter 118 for supply to a second input of the first summer 114. The data at the output of the first summer 114 are up sampled by a factor of two by an up sampler 120, and the up sampled data are inverse low pass filtered by an inverse low pass filter 122 for supply to a first input of a second summer 124.

The data at the input of the inverse discrete wavelet transform are further up sampled by a factor of two by an up sampler 126, and the up sampled data are inverse high pass filtered by an inverse high pass filter 130 for supply to a second input of the second summer 124. The data at the output of the second summer 124 are up sampled by a factor of two by an up sampler 132, and the up sampled data are inverse low pass filtered by an inverse low pass filter 134 for supply to a first input of a third summer 136.

Finally, the data at the input of the inverse discrete wavelet transform are up sampled by a factor of two by an up sampler 138, and the up sampled data are inverse high pass filtered by an inverse high pass filter 140 for supply to a second input of the third summer 136. The output of the third summer 136 is either processed by the block 106 of FIG. 5 or is the output of the block 106 as described above.

Assuming that the current position of the aircraft is between data points in the grid of the region being processed by the processor 22, it may be necessary to interpolate the data to the current position. There are many interpolation schemes, both linear and nonlinear (e.g., cubic-spline), which are compatible with the present invention.

For illustration purposes only, the inverse wavelet transform described above may be implemented by way of the following MATLAB function:

```
function out1=inv_97(sin,din);

out1=zeros(length(sin)*2,1);

d1=zeros(length(sin),1);

s1=zeros(length(sin),1);

d1=zeros(length(sin),1);

s2=zeros(length(sin),1);

d2=zeros(length(sin),1);
``` alpha=−1.586134342;
beta=−0.05298011854;
gamma=0.8829110762;
delta=0.4435068522;
eata=1.149604398;
% filter

```
d2=din*eata;

s2=sin/eata;

s1(1,1)=s2(1,1)−delta*d2(1,1);

for i=2:length(s2);

s1(i,1)=s2(i,1)−delta*(d2(i,1)+d2(i−1,1));
``` end

```
for i=1:length(d2)−1;

d1(i,1)=d2(i,1)−gamma*(s1(i,1)+s1(i+1,1));
``` end

```
d1(end,1)=d2(end,1)−gamma*s1(end,1);

out1(1,1)=s1(1,1)−beta*d1(1,1);

for i=4:2:length(out1);

out1(i−1,1)=s1(i/2,1)−beta*(d1(i/2,1)+d1(i/2−1,1));
``` end

```
for i=2:2:length(out1)−1;

out1(i,1)=d1(i/2,1)−alpha*(out1(i−1,1)+out1(i+1,1));
``` end

```
out1(end,1)=d1(length(out1)/2,1)−alpha*(out1(end-1,1));
```

Certain modifications of the present invention will occur to those practicing in the art of the present invention. For example, as described above, the inertial sensors 20 include a set of accelerometers to measure aircraft acceleration. However, the inertial sensors 20 may also include other sensors such as gyroscopes to measure aircraft angular rotational rates.

Also, the present invention has been described above with particular reference to aircraft. However, the present invention can be used for other vehicles such as spacecraft, submarines, etc.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

I claim:

1. A vehicle navigation method comprising:
   generating an inertial sensor signal relating to a navigational parameter of a vehicle;
   accessing discrete wavelet coefficients from a memory based on a position of the vehicle;
   performing an inverse discrete wavelet transform on the discrete wavelet coefficients to produce compensation data; and,
   compensating the inertial sensor signal based on the compensation data.

2. The vehicle navigation method of claim 1 wherein the performing of an inverse discrete wavelet transform comprises:
   performing the inverse discrete wavelet transform by column on the discrete wavelet coefficients to produce a matrix; and,
   performing the inverse discrete wavelet transform by row on the matrix to produce the compensation data.

3. The vehicle navigation method of claim 1 wherein the performing of an inverse discrete wavelet transform comprises:
   scaling the discrete wavelet coefficients; and,
   performing an inverse discrete wavelet transform on the scaled coefficients to produce the compensation data.

4. The vehicle navigation method of claim 3 wherein the performing of an inverse discrete wavelet transform comprises:
   performing the inverse discrete wavelet transform by column on the scaled coefficients to produce a matrix; and,
   performing the inverse discrete wavelet transform by row on the matrix to produce the compensation data.

5. The vehicle navigation method of claim 1 wherein the performing of an inverse discrete wavelet transform comprises:
   up sampling and inverse low pass filtering the discrete wavelet coefficients to produce first up sampled and filtered data;
   up sampling and inverse high pass filtering the discrete wavelet coefficients to produce second up sampled and filtered data;
   summing the first and second up sampled and filtered data to produce first summed data;
   up sampling and inverse low pass filtering the first summed data to produce third up sampled and filtered data;
   up sampling and inverse high pass filtering the discrete wavelet coefficients to produce fourth up sampled and filtered data;
   summing the third and fourth up sampled and filtered data to produce second summed data;

up sampling and inverse low pass filtering the second summed data to produce fifth up sampled and filtered data;

up sampling and inverse high pass filtering the discrete wavelet coefficients to produce sixth up sampled and filtered data; and summing the fifth and sixth up sampled and filtered data to produce the compensation data.

6. The vehicle navigation method of claim 5 wherein the performing of an inverse discrete wavelet transform comprises:

performing the inverse discrete wavelet transform by column on the discrete wavelet coefficients to produce a matrix; and, performing the inverse discrete wavelet transform by row on the matrix to produce the compensation data.

7. The vehicle navigation method of claim 5 wherein the performing of an inverse discrete wavelet transform comprises:

scaling the discrete wavelet coefficients; and, performing the inverse discrete wavelet transform on the scaled coefficients to produce the compensation data.

8. The vehicle navigation method of claim 7 wherein the performing of an inverse discrete wavelet transform comprises:

performing the inverse discrete wavelet transform by column on the scaled coefficients to produce a matrix; and, performing the inverse discrete wavelet transform by row on the matrix to produce the compensation data.

9. The vehicle navigation method of claim 8 wherein the compensating of the sensor signal based on the compensation data comprises interpolating the compensation data.

10. The vehicle navigation method of claim 1 wherein the accessing discrete wavelet coefficients comprises performing a lossless decompression of the discrete wavelet coefficients, and wherein the performing of an inverse discrete wavelet transform comprises performing the inverse discrete wavelet transform on the decompressed coefficients to produce the compensation data.

11. The vehicle navigation method of claim 10 wherein the performing of an inverse discrete wavelet transform comprises:

performing the inverse discrete wavelet transform by column on the decompressed coefficients to produce a matrix; and, performing the inverse discrete wavelet transform by row on the matrix to produce the compensation data.

12. The vehicle navigation method of claim 10 wherein the performing of an inverse discrete wavelet transform comprises:

scaling the decompressed coefficients; and, performing an inverse discrete wavelet transform on the scaled coefficients to produce the compensation data.

13. The vehicle navigation method of claim 12 wherein the performing of an inverse discrete wavelet transform comprises:

performing the inverse discrete wavelet transform by column on the scaled coefficients to produce a matrix; and, performing the inverse discrete wavelet transform by row on the matrix to produce the compensation data.

14. The vehicle navigation method of claim 10 wherein the performing of an inverse discrete wavelet transform comprises:

up sampling and inverse low pass filtering the decompressed coefficients to produce first up sampled and filtered data;

up sampling and inverse high pass filtering the decompressed coefficients to produce second up sampled and filtered data;

summing the first and second up sampled and filtered data to produce first summed data;

up sampling and inverse low pass filtering the first summed data to produce third up sampled and filtered data;

up sampling and inverse high pass filtering the decompressed coefficients to produce fourth up sampled and filtered data;

summing the third and fourth up sampled and filtered data to produce second summed data;

up sampling and inverse low pass filtering the second summed data to produce fifth up sampled and filtered data;

up sampling and inverse high pass filtering the decompressed coefficients to produce sixth up sampled and filtered data; and summing the fifth and sixth up sampled and filtered data to produce the compensation data.

15. The vehicle navigation method of claim 14 wherein the performing of an inverse discrete wavelet transform comprises:

performing the inverse discrete wavelet transform by column on the decompressed coefficients to produce a matrix; and, performing the inverse discrete wavelet transform by row on the matrix to produce the compensation data.

16. The vehicle navigation method of claim 14 wherein the performing of an inverse discrete wavelet transform comprises:

scaling the decompressed coefficients; and, performing the inverse discrete wavelet transform on the scaled coefficients to produce the compensation data.

17. The vehicle navigation method of claim 16 wherein the performing of an inverse discrete wavelet transform comprises:

performing the inverse discrete wavelet transform by column on the scaled coefficients to produce a matrix; and, performing the inverse discrete wavelet transform by row on the matrix to produce the compensation data.

18. The vehicle navigation method of claim 17 wherein the compensating the sensor signal based on the compensation data comprises interpolating the compensation data.

19. A method comprising:

performing a discrete wavelet transform on raw gravitational deflection data to produce coefficients;

performing a lossless compression on the coefficients to produce compressed coefficients; and, storing the compressed coefficients in a memory of a vehicle navigation system.

20. The method of claim 19 wherein the discrete wavelet transform is first performed by row until all of the raw gravitational deflection data is so processed and is only then performed by column to produce the coefficients.

21. The method of claim 19 wherein the performing of a lossless compression comprises:

scaling the coefficients; and, performing a lossless compression on the scaled coefficients to produce the compressed coefficients.

22. The method of claim 21 wherein the discrete wavelet transform is first performed by row until all of the raw gravitational deflection data is so processed and is only then performed by column to produce the coefficients.

23. The method of claim 21 wherein the performing of a lossless compression on the scaled coefficients comprises:
quantizing the scaled coefficients to produce quantized coefficients; and,
performing a lossless compression on the quantized coefficients to produce the compressed coefficients.

24. The method of claim 23 wherein the discrete wavelet transform is first performed by row until all of the raw gravitational deflection data is so processed and is only then performed by column to produce the coefficients.

25. The method of claim 23 wherein the performing of a lossless compression on the quantized coefficients comprises:
dividing the quantized coefficients into regions; and,
performing a lossless compression on the regional quantized coefficients to produce the compressed coefficients.

26. The method of claim 25 wherein the discrete wavelet transform is first performed by row until all of the raw gravitational deflection data is so processed and is only then performed by column to produce the coefficients.

27. The method of claim 19 wherein the performing of a discrete wavelet transform comprises:
high pass filtering and down sampling the raw gravitational deflection data to produce first filtered and down sampled data;
low pass filtering and down sampling the raw gravitational deflection data to produce second filtered and down sampled data;
high pass filtering and down sampling the second filtered and down sampled data to produce third filtered and down sampled data;
low pass filtering and down sampling the second filtered and down sampled data to produce fourth filtered and down sampled data;
high pass filtering and down sampling the fourth filtered and down sampled data to produce fifth filtered and down sampled data; and,
low pass filtering and down sampling the fourth filtered and down sampled data to produce sixth filtered and down sampled data;
wherein the first, third, fifth, and sixth filtered and down sampled data comprise the coefficients.

28. The method of claim 27 wherein the discrete wavelet transform is first performed by column until all of the raw gravitational deflection data is so processed and is only then performed by row to produce the coefficients.

29. The method of claim 27 wherein the performing of a lossless compression comprises:
scaling the coefficients; and,
performing a lossless compression on the scaled coefficients to produce the compressed coefficients.

30. The method of claim 29 wherein the discrete wavelet transform is first performed by column until all of the raw gravitational deflection data is so processed and is only then performed by row to produce the coefficients.

31. The method of claim 29 wherein the performing of a lossless compression on the scaled coefficients comprises:
quantizing the scaled coefficients to produce quantized coefficients; and,
performing a lossless compression on the quantized coefficients to produce the compressed coefficients.

32. The method of claim 31 wherein the discrete wavelet transform is first performed by column until all of the raw gravitational deflection data is so processed and is only then performed by row to produce the coefficients.

33. The method of claim 32 wherein the performing of a lossless compression on the quantized coefficients comprises:
dividing the quantized coefficients into regions; and,
performing a lossless compression on the regional quantized coefficients to produce the compressed coefficients.

34. The method of claim 33 wherein the discrete wavelet transform is first performed by column until all of the raw gravitational deflection data is so processed and is only then performed by row to produce the coefficients.

35. A method for using compressed wavelet transform coefficients in order to correct outputs of inertial sensors for gravitational deflections, wherein the compressed wavelet transform coefficients comprise gravitational deflection data that is first converted to discrete wavelet coefficients by a discrete wavelet transform and wherein the wavelet transform coefficients are then compressed to form the compressed wavelet transform coefficients, and wherein the method comprises:
generating an inertial sensor signal relating to a navigational state of a vehicle;
accessing the compressed discrete wavelet coefficients from a memory based on a position of the vehicle;
decompressing the accessed coefficients;
performing an inverse discrete wavelet transform on the decompressed coefficients to produce gravitational compensation data; and,
compensating the inertial sensor signal based on the gravitational compensation data.

36. The vehicle navigation method of claim 35 wherein the wavelet transform coefficients is scaled by a first scaling factor before compression, wherein the method further comprises scaling the decompressed coefficients by a second scaling factor prior to the performing of the inverse discrete wavelet transform, and wherein the second scaling factor is the inverse of the first scaling factor.

37. The vehicle navigation method of claim 35 wherein the performing of an inverse discrete wavelet transform comprises performing the inverse discrete wavelet transform first by column and then by row.

38. The vehicle navigation method of claim 37 wherein the wavelet transform coefficients is scaled by a first scaling factor before compression, wherein the method further comprises scaling the decompressed coefficients by a second scaling factor prior to the performing of the inverse discrete wavelet transform, and wherein the second scaling factor is the inverse of the first scaling factor.

39. The vehicle navigation method of claim 35 wherein the performing of an inverse discrete wavelet transform comprises:
up sampling and inverse low pass filtering the decompressed coefficients to produce first up sampled and filtered data;
up sampling and inverse high pass filtering the decompressed coefficients to produce second up sampled and filtered data;
summing the first and second up sampled and filtered data to produce first summed data;
up sampling and inverse low pass filtering the first summed data to produce third up sampled and filtered data;

up sampling and inverse high pass filtering the decompressed coefficients to produce fourth up sampled and filtered data;

summing the third and fourth up sampled and filtered data to produce second summed data;

up sampling and inverse low pass filtering the second summed data to produce fifth up sampled and filtered data;

up sampling and inverse high pass filtering the decompressed coefficients to produce sixth up sampled and filtered data; and summing the fifth and sixth up sampled and filtered data to produce the compensation data.

40. The vehicle navigation method of claim 39 wherein the wavelet transform coefficients is scaled by a first scaling factor before compression, wherein the method further comprises scaling the decompressed coefficients by a second scaling factor prior to the performing of the inverse discrete wavelet transform, and wherein the second scaling factor is the inverse of the first scaling factor.

41. The vehicle navigation method of claim 39 wherein the performing of an inverse discrete wavelet transform comprises performing the inverse discrete wavelet transform first by column and then by row.

42. The vehicle navigation method of claim 41 wherein the wavelet transform coefficients is scaled by a first scaling factor before compression, wherein the method further comprises scaling the decompressed coefficients by a second scaling factor prior to the performing of the inverse descrete wavelet transform, and wherein the second scaling factor is the inverse of the first scaling factor.

43. The vehicle navigation method of claim 42 wherein the compensating the sensor signal based on the compensation data comprises interpolating the compensation data.

* * * * *

UNITED STATES PATENT AND TRADEMARK OFFICE
CERTIFICATE OF CORRECTION

PATENT NO. : 6,651,002 B1  Page 1 of 1
DATED : November 18, 2003
INVENTOR(S) : Kenneth S. Morgan It is certified that error appears in the above-identified patent and that said Letters Patent is hereby corrected as shown below:

<u>Title page,</u>
Item [75], the inventor's name should read -- Kenneth S. Morgan --.

Signed and Sealed this

Thirteenth Day of January, 2004

JON W. DUDAS
*Acting Director of the United States Patent and Trademark Office*